United States Patent
Obrecht et al.

(12) 
(10) Patent No.: US 6,242,534 B1
(45) Date of Patent: Jun. 5, 2001

(54) RUBBER COMPOSITION, METHOD OF FORMULATING AND BLENDING THE SAME AND ARTICLE AND TIRES MADE THEREFROM

(75) Inventors: Werner Obrecht, Moers; Thomas Scholl, Bergisch Gladbach; Peter Wendling, Leverkusen; Michael Well, Vechelde, all of (DE); Victor Monroy, Charlotte, NC (US)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/365,226

(22) Filed: Jul. 30, 1999

(30) Foreign Application Priority Data

Aug. 1, 1998 (DE) .............................. 198 34 802

(51) Int. Cl.[7] .............. C08F 8/00; C08L 9/00; C08L 23/00; C08L 23/04
(52) U.S. Cl. ............. 525/191; 525/232; 525/233; 525/234; 525/235; 525/236; 525/237; 525/240; 525/241; 152/151; 152/450; 152/525; 152/548
(58) Field of Search ................... 525/191, 232, 525/233, 234, 235, 236, 237, 240, 241; 152/151, 450, 525, 548

(56) References Cited

U.S. PATENT DOCUMENTS 4,226,953 * 10/1980 Coran et al. ................. 525/193

FOREIGN PATENT DOCUMENTS

| 2226804 | 7/1998 | (CA) . |
| 2226917 | 7/1998 | (CA) . |
| 575851 | 12/1993 | (EP) . |
| 854170 | 7/1998 | (EP) . |
| 854171 | 7/1998 | (EP) . |

* cited by examiner

Primary Examiner—Nathan M. Nutter
(74) Attorney, Agent, or Firm—Greenblum & Bernstein, P.L.C.

(57) ABSTRACT

A rubber mixture containing at least one rubber component, at least one filler, and conventional additives that it contain at least one first gel as a filler, which is essentially comprised of a rubber, has a particle size of $3 \times 10^{-9}$ to $1 \times 10^{-6}$ m, and has a swelling index in toluene of 1 to 15, and at least the surface of this gel has acid or base groups, where these groups have not been produced by means of reaction with dithiophosphoric acid, and comprises:

a) at least one second gel as an additional filler, which is essentially comprised of a rubber, has a particle size of $3 \times 10^{-9}$ to $1 \times 10^{-6}$ m, and has a swelling index in toluene of 1 to 15, which is in a position to undergo a neutralization reaction with the acid or base groups of the first gel and/or b) contains at least one substance as an additional additive, which is capable of undergoing a neutralization reaction with the acid or base groups of at least one gel.

The rubber mixture demonstrates an improved hysteresis behavior in the vulcanized state so that, with the use of this rubber mixture in tires, for example, the rolling resistance is reduced and the wet slippage behavior is improved in relation to the conventional rubber mixture.

Methods of formulating such rubber mixtures are also provided.

48 Claims, No Drawings

RUBBER COMPOSITION, METHOD OF FORMULATING AND BLENDING THE SAME AND ARTICLE AND TIRES MADE THEREFROM

CROSS REFERENCE TO RELATED APPLICATIONS

The present application claims priority under 35 U.S.C. § 119 of German Patent Application No. 198 34 802.9, filed on Aug. 1, 1998, the disclosure of which is expressly incorporated by reference herein in its entirety.

Reference is made to U.S. application Ser. No. 09/365, 227 entitled "Rubber Composition, Method of Adding and Blending the Composition and Vehicle Tire Made From the Composition" and U.S. application Ser. No. 09/365,225, now U.S. Pat. No. 6,133,364, entitled "Rubber Composition, Method of Formulating the Composition and Vehicle Tire Made From the Composition", which is concurrently filed with the present application.

BACKGROUND OF THE INVENTION

1. Field of the Invention

The invention relates to a rubber mixture containing at least one rubber component, at least one filler, and, optionally, conventional additives.

2. Discussion of Background Information

Rubber mixtures are used for the production of rubber products for a wide variety of uses. Depending on the field of use, various demands are also placed on the corresponding rubber mixture employed. Thus, in addition to the rubber components of the rubber mixture, the rubber mixture contains other components, such as fillers, anti-aging agents, and vulcanizing agents, which significantly influence the properties of the finished rubber product. Therefore, suitable systems of polymers and/or other components must be prepared in order to obtain the appropriate properties of the rubber product. Fillers play an especially significant role in a rubber mixture. Thus, they contribute not only to reducing the cost of rubber mixtures, but their specific action on the rubber is also utilized. For this reason, there has been no lack of tests in which a wide variety of fillers, for example, were added into the rubber mixture. Thus, carbon black and silicic acid, for example, are known as fillers. It has been observed that rubber products which contain carbon black, for example, as a filler, have a sufficient mechanical load-bearing capacity, but with the use of these mixtures in tire treads, the tires demonstrate the disadvantage of a high rolling resistance and poor wet slippage behavior. An attempt has been made to solve this problem by adding silicic acid into the tread mixture, where a filler activator is required in turn for binding the silicic acid to the polymer. However, it was clear that rubber products which contain silicic acid as a filler and contain a conventional organosilane as a filler activator (e.g., bis-3-(triethoxysilylpropyl) tetrasulfide) insufficiently influence the hysteresis behavior and the reinforcing of the rubber product for modern fields of utilization. Thus, in particular for the production of vehicle tires (e.g., treads), rubber mixtures are required that, in the vulcanized state, lend the tire an even lower rolling resistance with an additionally improved wet slippage behavior. At the same time, other mechanical properties, such as durability, should be negatively influenced as little as possible.

EP 0 854 171 A1 describes rubber gels whose surfaces are modified with vulcanization-active, sulfur-containing chemicals. On the surface of the gel, there are then sulfur-containing reactive groups (dithiophosphoric acid groups, among others), which permit bonding to the double bond-containing rubber.

SUMMARY OF THE INVENTION

Other exemplary embodiments and advantages of the present invention may be ascertained by reviewing the present disclosure and the accompanying drawing.

The invention provides rubber mixtures that demonstrate an improved hysteresis behavior in the vulcanized state so that, for example, with the use of these rubber mixtures in tires, the rolling resistance is reduced and the wet slippage behavior is improved in comparison to conventional rubber mixtures. In addition, the elastomer mixture is better reinforced through the use of a suitable filler system.

The invention further provides methods of formulating such rubber mixtures.

The invention further provides articles, such as pneumatic tires, and vehicle tires, formed of such rubber mixtures.

The invention provides a composition comprising a rubber mixture which comprises:

A) at least one rubber component;
B) at least one first gel as a filler, which comprises a rubber, has a particle size of from about $3 \times 10^{-9}$ to about $1 \times 10^{-6}$ m, and has a swelling index in toluene of from about 1 to about 15, and wherein at least the surface of the gel has groups selected from acid and base groups and combinations thereof, wherein with the proviso that these groups have not been produced by means of reaction with dithiophosphoric acid; and,
C) at least one second gel as an additional filler, which comprises a member selected from
  1) a rubber, has a particle size of from about $3 \times 10^{-9}$ to about $1 \times 10^{-6}$ m, and has a swelling index in toluene of from about 1 to about 15, which is capable of undergoing a neutralization reaction with the acid or base groups of the first gel; and
  2) at least one substance as an additional additive, which is capable of undergoing a neutralization reaction with acid or base groups of at least one gel, and combinations of 1) and 2).

The invention also provides a vehicle tire comprising a tread formed of a composition comprising a rubber mixture which comprises:

A) at least one rubber component;
B) at least one first gel as a filler, which comprises a rubber, has a particle size of from about $3 \times 10^{-9}$ to about $1 \times 10^{-6}$ m, and has a swelling index in toluene of from about 1 to about 15, and wherein at least the surface of the gel has groups selected from acid and base groups and combinations thereof, wherein with the proviso that these groups have not been produced by means of reaction with dithiophosphoric acid; and,
C) at least one second gel as an additional filler, which comprises a member selected from
  1) a rubber, has a particle size of from about $3 \times 10^{-9}$ to about $1 \times 10^{-6}$ m, and has a swelling index in toluene of from about 1 to about 15, which is capable of undergoing a neutralization reaction with the acid or base groups of the first gel; and
  2) at least one substance as an additional additive, which is capable of undergoing a neutralization reaction with acid or base groups of at least one gel, and combinations of 1) and 2).

The invention also provides a pneumatic tire comprising a composition comprising a rubber mixture which comprises:

A) at least one rubber component;

B) at least one first gel as a filler, which comprises a rubber, has a particle size of from about $3\times10^{-9}$ to about $1\times10^{-6}$ m, and has a swelling index in toluene of from about 1 to about 15, and wherein at least the surface of the gel has groups selected from acid and base groups and combinations thereof, wherein with the proviso that these groups have not been produced by means of reaction with dithiophosphoric acid; and, C) at least one second gel as an additional filler, which comprises a member selected from
1) a rubber, has a particle size of from about $3\times10^{-9}$ to about $1\times10^{-6}$ m, and has a swelling index in toluene of from about 1 to about 15, which is capable of undergoing a neutralization reaction with the acid or base groups of the first gel; and
2) at least one substance as an additional additive, which is capable of undergoing a neutralization reaction with acid or base groups of at least one gel, and combinations of 1) and 2).

The invention also provides a method of formulating and blending a composition comprising forming a mixture comprising at least one rubber component and at least one first gel as a filler, which comprises a rubber, has a particle size of from about $3\times10^{-9}$ to about $1\times10^{-6}$ m, and has a swelling index in toluene of from about 1 to about 15, and wherein at least the surface of the gel has groups selected from acid and base groups and combinations thereof, with the proviso that these groups have not been produced by means of reaction with dithiophosphoric acid; and adding at least one second gel as an additional filler, which comprises a member selected from 1) a rubber, has a particle size of from about $3\times10^{-9}$ to about $1\times10^{-6}$ m, and has a swelling index in toluene of from about 1 to about 15, which is capable of undergoing a neutralization reaction with the acid or base groups of the first gel; and
2) at least one substance as an additional additive, which is capable of undergoing a neutralization reaction with acid or base groups of at least one gel, and combinations of 1) and 2).

The acid and/or base groups of at least one gel may be produced by reaction with an unsaturated material. The surface of at least one gel may comprise carboxyl groups. The surface of at least one gel may comprises hydroxyl groups.

The surface of at least one gel may comprise amino groups. The substance of 2) may comprise a metal salt or a metal oxide. The metal salt may comprise zinc stearate. The metal oxide may comprise a member selected from magnesium oxide and zinc oxide and mixtures thereof.

The rubber mixture may contain from about 10 to about 110 phr of at least one gel based on 100 parts of the weight of all of the rubber components.

The rubber component may comprise a member selected from natural rubber, polyisoprene, styrene-butadiene copolymer, polybutadiene, and mixtures thereof.

The first gel of A) may be present in an amount of from about 10 phr to about 110 phr, preferably from about 25 phr to about 85 phr, and more preferably from about 40 phr to about 60 phr, based on 100 parts by weight of the rubber component, and the second gel of B) may be present in an amount of up to about 110 phr, preferably from about 25 phr to about 85 phr, and more preferably from about 40 phr to about 60 phr, based on 100 parts by weight of the rubber component.

The invention also provides a rubber article subject to stress, selected from a pneumatic spring, a conveyor belt, a drive belt, a pneumatic tire, a vehicle tire, and combinations thereof, comprising such a rubber composition as any of the foregoing. The foregoing rubber article may be selected from a pneumatic tire, a vehicle tire, and combinations thereof and further comprising a sidewall, a reinforcement layer, or a tread.

The invention also provides a rubber mixture comprising at least one first gel as a filler, which consists essentially of a rubber, has a particle size of $3\times10^{-9}$ to $1\times10^{-6}$ m, and has a swelling index in toluene of 1 to 15, and at least the surface of this gel has acid or base groups, where these groups have not been produced by means of reaction with dithiophosphoric acid, and furthermore a) contains at least one second gel as an additional filler, which is essentially composed of a rubber, has a particle size of $3\times10^{-9}$ to $1\times10^{-6}$ m, and has a swelling index in toluene of 1 to 15, which is in a position to undergo a neutralization reaction with the acid or base groups of the first gel and/or b) contains at least one substance as an additional additive, which is in a position to undergo a neutralization reaction with the acid or base groups of at least one gel.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Without wishing to be bound by theory, it is believed that certain benefits associated with the invention are achieved through the construction of an ionic network in the elastomer mixture, which is formed through the neutralization reaction of the acid or base groups of the first gel with the corresponding groups of a second gel and/or another substance, a filler system is produced which, after vulcanization, delivers a rubber product for a wide variety of uses, having favorable mechanical properties, for example, with regard to the tensile modulus. In addition, according to the invention, vulcanizates can now be produced, which 9 have outstanding damping properties so that they are particularly suited for use in tire treads due to the reduction in the rolling resistance and simultaneous improvement of the wet slippage behavior. Through the use of the rubber mixture according to the invention, the use of silicic acid, for example, can be eliminated, which allows the prevention of the problems connected with it, which can occur due to the slight electrical conductivity of silicic acid-filled mixtures.

The gel comprises a rubber, which comprises, for example, at least one rubber component (for example, NR, BR, SBR, NBR) and, if necessary, other additives such as anti-aging agents.

The production of the polymer matrix of the gel used in the rubber mixture according to the invention, on whose surface acid or base groups are disposed, can take place, for example, in the following manner:
1. by means of copolymerization of at least two monomers, e.g., polymerization of butadiene with methacrylic acid (acrylic acid).
2. subsequent functionalization of a polymer (e.g., by means of grafting) e.g., styrene-butadiene copolymer is grafted onto the acrylic acid or vinylpyridine.
3. subsequent modification of a polymer (e.g., by means of splitting ester groups) e.g., polymerization of butadiene with methacrylic acid methylester and subsequent hydrolysis.

The production of gels is carried out based on the latex phase of the polymer and is described in detail below.

After a corresponding coagulation of the rubber latex, which can be produced, for example, in accordance with the above-mentioned processes 1 to 3, it is cured e.g., in an autoclave, through the addition of a curing agent (e.g., a peroxide (e.g., dicumyl peroxide)). Enough curing agent is added that the swelling index in toluene of the gel (as used herein, latex, which is at least precured through the addition of a supplemental curing agent, is called gel) is set between about 1 and about 15, more preferably between about 1 and about 10. However, it is also possible to provide the surface of the latex with acid or base groups after the setting of the swelling index (production of the gel), for example, according to the above-mentioned processes 2 and 3.

Furthermore, it is possible to add other additives to the latex phase or also to the gel, such as anti-aging agents. The gel is withdrawn, filtered out, washed, and dried to constant weight. The gel obtained has a particle size of 3 to 1000 nm (determined according to the ultra-centrifuging method DIN 53 206 (at a centrifuge speed of 20,000 rpm)). There is also the possibility of precipitating the precured or cured latex (gel) along with uncured latex so that a supplemental isolation of the gel can be eliminated.

The swelling index ($Q_i$) of the gels is calculated from the weight of the solvent-containing gel (after centrifuging at 20,000 rpm) and the weight of the dry gel:

$$Q_i = \text{wet weight of gel/dry weight of gel}$$

In order to determine the swelling index, as an example, 250 mg of gel is allowed to swell for 24 hours with agitation in 25 ml of toluene. The gel is then centrifuged out (at 20,000 rpm) and weighed (wet weight) and then is dried to constant weight at 70° C. and weighed again (dry weight).

On the surface of gels, there are acid or base groups, e.g., COOH, —NH$_2$,— and OH, among others, which can undergo a neutralization reaction with other gels and/or substances.

It is particularly preferable if the acid and/or base groups of at least one gel are produced by reaction with an unsaturated compound, preferably, a mixture of unsaturated compounds. As a result, a simple bonding of the acid or base groups to the surface of the gels is possible.

The acid groups on the gel can, for example, be produced by reaction of the gel with acrylic acid, methacrylic acid, or itaconic acid. Base groups can be applied to the surface of the gel through the use of, for example, vinylpyridine or diaminopropylmethacrylamide.

The improvements in the properties of the rubber mixture of the invention are particularly clear if out of 100 parts of the overall rubber mass, the rubber mixture contains 10 to 110 phr of at least one gel.

According to the invention, at least one gel with acid or base groups is contained in the rubber mixture. In order to be able to undergo a neutralization reaction, it is necessary that a component also be contained in the rubber mixture, which represents a corresponding reaction partner. On the one hand, this can be another gel whose surface is correspondingly modified and, on the other hand, extra substances can be added to the rubber mixture for this purpose. It is also possible to combine one or several different modified gels with one or several of such substances. The quantity of added gels and/or substance(s) should result stoichiometrically from the quantity of the first gel.

Substances such as metal salts, e.g., zinc stearate, salts of α, β-unsaturated carboxylic acids (e.g., zinc salts or magnesium salts of acrylic acid, methacrylic acid, or crotonic acid) can be used as corresponding reaction partners. Furthermore, it is possible to use metal oxides such as zinc oxide or magnesium oxide.

Furthermore, the rubber mixture according to the invention contains conventional additives such as anti-aging agents (e.g., 6PPD: N-phenyl-N'-(1,3-dimethylbutyl)-p-phenylenediamine or DTPD: N,N'-ditolyl-p-phenylenediamine), processing agents (e.g., stearic acid, waxes, fats, dispersing agents), and softeners (e.g., phthalic acid esters).

Other fillers that can be contained in the rubber mixture according to the invention particularly include conventional active fillers such as carbon black and silicic acid. The carbon blacks can have the following characteristics: DBP count (ASTM-D 2414) 90 to 200 cm$^3$/100 g and CTAB count (ASTM-D 3765) of 35 to 220 m$^2$/g. The silicic acid can, for example, have a BET surface of 145–270 m$^2$/g (ASTM D 5604), a CTAB count of 120–285 m$^2$/g (ASTM D 3765) and a pore volume of 0.7–1.7 mug (DIN 66133). For example, VN3 (Degussa AG, Germany) can be used as the silicic acid. Furthermore, inactive fillers, such as chalk, can be contained in the rubber mixture. In addition, certain percentages of uncured gels or gels that do not have the corresponding characteristics can be contained in the rubber mixture. Their percentage, however, should be kept as low as possible so that the properties of the vulcanizate are not negatively influenced.

Sulfur or a sulfur donor (e.g., DTDM-dimorpholyldisulfide) can be used for the vulcanization of the rubber mixture. However, it is also possible to have the vulcanization occur with the aid of other vulcanizing agents (e.g., peroxides, resins, radiation). In addition, vulcanization-influencing substances, such as accelerators or activators for the corresponding type of vulcanization are added to the rubber mixture (such as for the sulfur vulcanization—e.g., CBS: benzothiazyl-2-cyclohexylsulfenamide, TMTD: tetramethylthiuramdisulfide, TBBS: benzothiazyl-2-tert.-butylsulfenamide).

As a rubber component, the rubber mixture according to the invention contains at least one polymer, preferably selected from natural rubber or cis-polyisoprene, having a cis-1,4-percentage>90 mol % or styrene-butadiene copolymer or polybutadiene or mixtures thereof.

The polyisoprene can be obtained by means of stereospecific polymerization in solution with Ziegler-Natta catalysts (e.g., TiCl$_4$/Al(Alkyl)$_3$) or through the use of finely distributed lithium alkylene (e.g., n-butyl lithium). Preferred styrene-butadiene copolymers are those with contents of polymerized-in styrene of 18 to 60, preferably 20 to 50 wt. % solution or emulsion polymerizates.

Furthermore, polybutadiene is preferably used for the rubber mixture according to the invention. It is therefore immaterial which process has been used to produce it.

Furthermore, the rubber mixture according to the invention can contain one or several rubber components known from the prior art, e.g., the following: butyl rubber (IIR), acrylonitrile-butadiene copolymer (NBR), hydrated acrylonitrile-butadiene copolymer (HNBR), ethylene-propylene copolymer (EPM), ethylene-propylene-diene-terpolymer (EPDM).

The production of the rubber mixture according to the invention can be carried out in different ways. Thus, it is possible in a first mixing stage to introduce the gel into the mixing unit in a master batch with one or several rubber components and, if necessary, other conventional additives. In a second mixing stage, additional filler can be introduced into the basic mixture together with a possible substance, which has acid or base groups, and once more, other conventional additives can be added if necessary. However, it is also possible to reverse the sequence of the addition of the gel, the filler, and the substance. After the completion of the basic mixture, after a possible intermediary storage, the vulcanization components are added to this basic mixture and consequently the finished mixture is produced. After a blank is formed, it is subjected to vulcanization.

As mentioned above, the rubber mixture according to the invention can be used for producing rubber articles that are placed under stress. These include, for example, pneumatic springs, conveyor belts, belts, and the like.

Whole vehicle tires may be formed from compositions of the invention. It is particularly preferable if the rubber mixture according to the invention is used for producing components of vehicle tires. In this case, for example, side-walls, reinforcing layers, etc., can be made from it. Once again, it is preferable if the tread of a vehicle tire, particularly pneumatic vehicle tires, is made of the rubber mixture according to the invention. In this connection, the tread can be constructed of one part or several parts (cap and base construction). Particularly with the use of the rubber mixture for the tread part, which comes into contact with the road (cap), the rubber mixture according to the invention also has an advantageous effect on the rolling resistance and the wet slippage behavior. Otherwise, the pneumatic vehicle tires have a conventional design with regard to structure and mixture composition.

EXAMPLES

The invention will be explained in detail in conjunction with the following exemplary embodiment:

Example 1

KA 8650/37: 50% NR Master Batch with Gel A

KA 8650/37 is a 50% NR master batch, which contains gel A.

Gel A is produced based on Baystal 1357/3 from Polymer Latex GmbH (Port Jérôme), by means of post-curing with 1.5 phr dicumyl peroxide (DCP) and through subsequent carboxylation with 15 phr acrylic acid.

Baystal 1357/3 from Polymer Latex GmbH (Port Jérôme) is a noncarboxylated SBR latex with a styrene content of 22 wt. %, a solids content of 38 wt. %, and a pH value of 10.2. The latex particles have a diameter of $d_{10}$=52 nm, $d_{50}$=58 nm, and $d_{80}$=63 nm. The density of the latex particles is 0.9329 g/cm$^3$. The gel content of the polymer that is isolated from the latex is 76 wt. %, the swelling index of the gelled polymer portion is 57 (wet weight/dry weight in toluene), and the glass temperature of the SBR is −58° C.

For the post-curing with dicumyl peroxide (DCP), the latex is diluted to a solids concentration of 30 wt. %, and is placed in an autoclave. DCP is added in solid form at room temperature (1.5 phr with reference to solid product). By heating the latex to 60° C., the DCP is melted and is thoroughly distributed into the latex by stirring. In order to remove oxygen, the reactor contents are evacuated while stirring at 60° C. and are compressed with nitrogen. The evacuation/$N_2$ gassing cycle is repeated 3 times. After this, the reactor is heated to 150° C. After the heating, the interior temperature is maintained at least at 150° C. for 45 min. After this, the gel produced is cooled and filtered through a Monodur cloth.

After the curing with DCP, the pH value of the gel is 9.5. The particle size and the particle size distribution of the gel particles remain practically uninfluenced by the post-curing; the density of the gel particles increases to 0.9776 g/cm$^3$; the gel content of the polymer that is isolated from the latex increases to 97.4 wt. % and the swelling index of the gelled polymer portion increases to 5.7 (wet weight/dry weight in toluene); the glass temperature increases to −25° C.

The carboxylation of the post-cured SBR latex (gel) is carried out as follows:

The latex (gel), which has been cured with 1.5 phr dicumyl peroxide, is placed in a 3-neck flask and at room temperature, this gel initially has 1 wt. % with reference to latex solids, of a 3.2% aqueous solution of Mersolat K 30 added to it (Na salt of an alkyl sulfonate from Bayer AG, Leverkusen, Germany). Before the s addition of the acrylic acid, the gel is diluted with water so that with a quantitative acrylic acid transformation, the theoretical final solids content of the gel is 20 wt. %. After the addition of 15 phr, with reference to the gel solids content, of a 99.8% acrylic acid (Interorgana company, Köln, Germany) and the addition of 0.6 phr of 50% p-menthane hydroperoxide (Triganox NT 50 from Akzo Chemie, Arnheim, Netherlands), the reaction mixture is heated to 70° C. and within 15 minutes, 0.3 wt. %, with reference to gel solids content, of an aqueous 1.5 wt. % potassium peroxide disulfate solution is added. After a reaction time of 3 hours at 70° C., the gel has a polymerization transformation of approximately 95%. The pH value of the gel is 3.6. The density of the gel particles is 1.0216 g/cm$^3$. The gel content of the isolated polymer is 97 wt. % (determination in toluene at room temperature) and the swelling index of the gelled portion is 3.4 (wet weight/dry weight in toluene). The acid number of the polymer is 31 mg KOH/g polymer and the glass temperature of the polymer remains virtually unchanged at −26° C.

In order to assure a good distribution of the gels in the subsequent rubber matrix, the carboxylated gel is processed as an NR master batch, where an NR/gel weight ratio of 50/50 is set.

Taytex with a solids concentration of 61 wt. % (importer: Theodor Durrieu, Hamburg, Germany) is used as an NR master batch component.

Before the mixing of the NR latex with the carboxylated gel, 5 wt. % Dresinate 731 solution (sodium salt of the disproportionate abietinic acid from the Hercules company, Wilmington, USA) is added to the NR latex. Then, the NR latex and the carboxylated gel are mixed at room temperature for 10 minutes with intense stirring.

After the production of the NR latex/gel mixture, an anti-aging agent dispersion is added. A 10% aqueous dispersion of an aminic anti-aging agent is used for this. In order to stabilize 1 kg of solid product, the following are used: 50 g of a dispersion of Vulkanox 4020 (N-isopropyl-N'-phenyl-p-phenylene-diamine from Bayer AG, Leverkusen, Germany), 0.0913 g NaOH, and 0.45 g Emulsifier T11 (partially hydrogenated tallow fatty acid from Procter & Gamble, Cincinnati, USA), and 0.193 g Oulu GP 331 (unmodified resin acid from Veitsiluto, Oulu, Finland).

For the coagulation, the stabilized NR latex/gel mixture is stirred into an electrolyte solution heated to 60° C., where for the coagulation of 1 kg solid product, the following are introduced:

an electrolyte solution of 10 1 water; 75 g common salt; 13.6 g Al sulfate 18 crystal water; 1.5 g gelatin.

During the coagulation, the pH value is kept at pH =4.0 with 10% sulfuric acid.

The product is filtered out and rewashed with approximately 40 l lewatite water, and it is dried to constant weight at 70° C. in the vacuum-drying cabinet.

Example 2

KA 8650/32: 50% NR Master Batch with Gel B

KA 8650/32 is a 50% NR master batch, which contains the gel B

Gel B is produced based on Baystal 1357/4 from Polymer Latex GmbH (Port Jérôme), by means of post-curing with 1.5 phr dicumyl peroxide (DCP) and through subsequent grafting of the post-cured latex with $^{2}0$ phr 4-vinylpyridine.

Baystal 1357/4 from Polymer Latex GmbH (Port Jérôme) is a noncarboxylated SBR latex with a styrene content of 22 wt. %, a solids content of 38 wt. %, and a pH value of 10.3. The latex particles have a diameter of $d_{10}32$ 50 nm, $d_{50}=56$ nm, and $d_{80}=60$ nm. The density of the latex particles is 0.9281 g/cm$^3$. The gel content is 75 wt. % and the swelling index of the gelled portion is 61 (wet weight/dry weight in toluene). The glass temperature of the SBR is –57° C.

The post-curing with dicumyl peroxide is carried out as described in KA 8650/37.

The modification of the post-cured SBR latex (gel) with vinylpyridine is carried out as follows:

The latex (gel), which has been cured with 1.5 phr dicumyl peroxide, is placed in a 3-neck flask and at room temperature, this gel initially has 1 wt. % with reference to gel solids, of a 2.85% aqueous solution of Mersolat K 30 added to it (Na salt of an alkyl sulfonate from Bayer AG, Leverkusen, Germany). Before the addition of the vinylpyridine, the gel is diluted with water so that with a quantitative vinylpyridine transformation, the theoretical final solids content of the gel is 20 wt. %. After the addition of 20 phr, with reference to the gel solids content, of 95% 4-vinylpyridine (Aldrich-Chemie, Steinheim, Germany) and the addition of 0.6 phr of 50% p-menthane hydroperoxide (Triganox NT 50 from Akzo Chemie, Arnheim, Netherlands), the reaction mixture is heated to 70° C. and within 15 minutes, 0.5 wt. %, with reference to gel solids, of an aqueous 1.5 wt. % potassium peroxide disulfate solution is added and the reaction contents are heated to 90° C. After approximately 1 hour at 90° C, the polymerization transformation is almost quantitative.

The pH value of the gel is 8.7. The gel particles have a diameter of $d_{10}=63$ nm, $d_{50}=95$ nm, and $d_{80}=129$ nm. The density of the gel particles is 1.0088 g/cm$^3$. The gel content of the isolated polymer is 98 wt. % (determination in toluene at room temperature) and the swelling index of the gelled portion is 4.2 (wet weight/dry weight in toluene); the glass temperature of the polymer is –24° C. and the N content, determined through elementary analysis, is 2.1 wt. %.

The SBR latex (gel), which has been post-cured with dicumyl peroxide and grafted with 20 phr 4-vinylpyridine, is processed as a 50% NR master batch, as in the case of KA 8650/37 (see above).

In Table 1 below, a rubber mixture has been produced in a conventional manner.

TABLE 1

| Components | Reference Prior Art [phr] | Reference [phr] | Invention [phr] | Invention [phr] |
|---|---|---|---|---|
| | 1 | 2 | 3 | 4 |
| natural rubber | 100 | 50 | 50 | 50 |
| carbon black N121 | 50 | 25 | 25 | 25 |
| gel B | — | 100 | — | 50 |
| gel A | — | — | 100 | 50 |
| anti-aging agent 6 PPD | 1.5 | 1.5 | 1.5 | 1.5 |
| zinc oxide | 3 | — | 10 | 3 |
| stearic acid | 2 | 2 | 2 | 2 |
| sulfur | 1.8 | 1.8 | 1.8 | 1.8 |
| accelerator TBBS | 1 | 1 | 1 | 1 |

The unit phr relates to 100 parts of the overall weight of the rubber components. (The gels were in a 50:50 master batch in natural rubber.)

The rubber mixture was vulcanized for 30 minutes at 150° C.

TABLE 2

| Properties | Reference Prior Art | Reference | Invention | Invention |
|---|---|---|---|---|
| | 1 | 2 | 3 | 4 |
| tensile strength [MPa] DIN 53504 | 24.6 | 15.3 | 20.4 | 20.7 |
| elongation at break [%] DIN 53504 | 550 | 513 | 454 | 460 |
| tensile modulus 100% [MPa] DIN 53504 | 1.98 | 2.06 | 2.93 | 2.42 |
| tensile modulus 300% [MPa] DIN 53504 | 11.77 | 7.59 | 13.57 | 11.82 |
| hardness [Shore A] DIN 53505 | 60 | 67 | 68 | 65 |
| Tanδ 0° C. DIN 53512 | 0.1454 (100%) | not measured | 0.2056 (141%) | 0.2059 (142%) |
| Tanδ 60° C. DIN 53512 | 0.1308 (100%) | not measured | 0.1100 (119%) | 0.1160 (113%) |

It can be seen from Table 2 that conventional mixtures without gels (reference 1) do indeed have a sufficiently favorable mechanical durability, but they are only insufficiently suitable for use in tire treads due to a poor wet slippage behavior (low Tanδ °C. values) and a high rolling resistance (high Tanδ 60° C. values).

If only modified gels are mixed in, i.e., gels whose surfaces have, e.g., base centers, (reference 2), no significant improvements in the mechanical durability of the vulcanizate, particularly in the tensile modulus, could be observed.

If modified gels are added to the mixture in combination with a corresponding gel and/or substance (invention 3 and 4), the tensile modulus of the vulcanizate can be increased. The tensile modulus provides information about the rigidity of the vulcanized product. If these rubber mixtures (inventions 3 and 4) are used to produce tire treads for vehicle tires, this signifies an increased rigidity, e.g., of the profiled block edges, which results in better traction. It can be seen from the Tanδ values that the mixtures 3 and 4 according to the invention demonstrate a better wet slippage behavior in comparison to reference 1, while at the same time demonstrating a reduced rolling resistance. Therefore in particular, pneumatic vehicle tires can be produced which have increased tensile moduluses while having optimal damping properties, where the driving comfort, the traction, and the service life of the tire are improved as a result.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A composition comprising a rubber mixture which can be vulcanized which comprises:
   A) at least one rubber component;
   B) at least one first gel as a filler, which comprises a rubber, has a particle size of from about $3 \times 10^{-9}$ to about $1 \times 10^{-6}$ m, and has a swelling index in toluene of from about 1 to about 15, and wherein at least the surface of the gel has groups selected from acid and base groups and combinations thereof, with the proviso that these groups have not been produced by means of reaction with dithiophosphoric acid; and,
   C) at least one second gel as an additional filler, which comprises a member selected from
      1) a rubber, has a particle size of from about $3 \times 10^{-9}$ to about $1 \times 10^{-6}$ m, and has a swelling index in toluene of from about 1 to about 15, which is capable of undergoing a neutralization reaction with the acid or base groups of the at least one first gel; and
      2) at least one substance as an additional additive, which is capable of undergoing a neutralization reaction with the acid or base groups of the at least one first gel, and combinations of 1) and 2).

2. The rubber mixture of claim 1, wherein the acid and/or base groups of the at least one first gel are produced by reaction with an unsaturated material.

3. The rubber mixture of claim 1, wherein the surface of the at least one first gel comprises carboxyl groups.

4. The rubber mixture of claim 1, wherein the surface of the at least one first gel comprises hydroxyl groups.

5. The rubber mixture of claim 1, wherein the surface of the at least one first gel comprises amino groups.

6. The rubber mixture of claim 1, wherein the at least one second gel comprises the substance of 2) which comprises a metal salt or a metal oxide.

7. The rubber mixture of claim 6, wherein the substance of 2) comprises metal salt and the metal salt comprises zinc stearate.

8. The rubber mixture claim 6, wherein the substance of 2) comprises metal oxide and the metal oxide comprises a member selected from magnesium oxide and zinc oxide and mixtures thereof.

9. The rubber mixture of claim 1, wherein the rubber mixture contains from about 10 to about 10 phr of the at least one first gel based on 100 parts of the weight of all of the rubber components.

10. The rubber mixture of claim 1, wherein the rubber component comprises a member selected from natural rubber, polyisoprene, styrene-butadiene copolymer, polybutadiene, and mixtures thereof.

11. The rubber mixture of claim 1, wherein the at least one first gel is present in an amount of from about 10 phr to about 110 phr based on 100 parts by weight of the rubber component, and the at least one second gel is present in an amount of up to about 110 phr based on 100 parts by weight of the rubber component.

12. The rubber mixture of claim 11, wherein the at least one first gel is present in an amount of from about 25 phr to about 85 phr based on 100 parts by weight of the rubber component, and the at least one second gel is present in an amount of from about 25 phr to about 85 phr based on 100 parts by weight of the rubber component.

13. The rubber mixture of claim 12, wherein the at least one first gel is present in an amount of from about 40 phr to about 60 phr based on 100 parts by weight of the rubber component, and the at least one second gel is present in an amount of from about 40 phr to about 60 phr based on 100 parts by weight of the rubber component.

14. A rubber article subject to stress, selected from a pneumatic spring, a conveyor belt, a drive belt, a pneumatic tire, a vehicle tire, and combinations thereof, comprising a rubber composition of claim 1.

15. The rubber article of claim 14, selected from a pneumatic tire, a vehicle tire, and combinations thereof and further comprising a sidewall, a reinforcement layer, or a tread.

16. The rubber mixture of claim 1, wherein the acid and/or base groups of the at least one first gel are produced by reaction with an unsaturated material, and wherein the surface of the at least one first gel comprises a member selected from carboxyl groups, hydroxyl groups, amino groups and mixtures thereof and wherein the at least one second gel comprises the substance of 2) which comprises a metal salt comprising zinc stearate or a metal oxide comprising a member selected from magnesium oxide and zinc oxide and mixtures thereof, wherein the rubber component comprises a member selected from natural rubber, polyisoprene, styrene-butadiene copolymer, polybutadiene, and mixtures thereof, and wherein the at least one first gel is present in an amount of from about 10 phr to about 110 phr based on 1 00 parts by weight of the rubber component, and the at least one second gel is present in an amount of up to about 1 10 phr based on 100 parts by weight of the rubber component.

17. A vehicle tire comprising a tread formed from a composition comprising a vulcanized rubber mixture which comprises:
   A) at least one rubber component;
   B) at least one first gel as a filler, which comprises a rubber, has a particle size of from about $3 \times 10^{-9}$ to about $1 \times 10^{-6}$ m, and has a swelling index in toluene of from about 1 to about 15, and wherein at least the surface of the gel has groups selected from acid and base groups and combinations thereof, with the proviso that these groups have not been produced by means of reaction with dithiophosphoric acid; and,
   C) at least one second gel as an additional filler, which comprises a member selected from
      1) a rubber, has a particle size of from about $3 \times 10^{-9}$ to about $1 \times 10^{-6}$ m, and has a swelling index in toluene of from about 1 to about 15, which is capable of undergoing a neutralization reaction with the acid or base groups of the at least one first gel; and
      2) at least one substance as an additional additive, which is capable of undergoing a neutralization reaction with the acid or base groups of the at least one first gel, and combinations of 1) and 2).

18. The vehicle tire of claim 17, wherein the acid and/or base groups of the at least one first gel are produced by reaction with an unsaturated material.

19. The vehicle tire of claim 17, wherein the surface of the at least one first gel comprises carboxyl groups.

20. The vehicle tire of claim 17, wherein the surface of the at least one first gel comprises hydroxyl groups.

21. The vehicle tire of claim 17, wherein the surface of the at least one first gel comprises amino groups.

22. The vehicle tire of claim 17, wherein the at least one second gel comprises the substance of 2) which comprises a metal salt or a metal oxide.

23. The vehicle tire of claim 22, wherein the substance of 2) comprises metal salt and the metal salt comprises zinc stearate.

24. The vehicle tire claim 22, wherein the substance of 2) comprises metal oxide and the metal oxide comprises a member selected from magnesium oxide and zinc oxide and mixtures thereof.

25. The vehicle tire of claim 17, wherein the rubber mixture contains from about 10 to about 110 phr of the at least one first gel based on 100 parts of the weight of all of the rubber components.

26. The vehicle tire of claim 17, wherein the rubber component comprises a member selected from natural rubber, polyisoprene, styrene-butadiene copolymer, polybutadiene, and mixtures thereof.

27. A pneumatic tire formed from a composition comprising a vulcanized rubber mixture which comprises:
A) at least one rubber component;
B) at least one first gel as a filler, which comprises a rubber, has a particle size of from about $3 \times 10^{-9}$ to about $1 \times 10^{-6}$ m, and has a swelling index in toluene of from about 1 to about 15, and wherein at least the surface of the gel has groups selected from acid and base groups and combinations thereof, with the proviso that these groups have not been produced by means of reaction with dithiophosphoric acid; and,
C) at least one second gel as an additional filler, which comprises a member selected from
1) a rubber, has a particle size of from about $3 \times 10^{-9}$ to about $1 \times 10^{-6}$ m, and has a swelling index in toluene of from about 1 to about 15, which is capable of undergoing a neutralization reaction with the acid or base groups of the at least one first gel; and
2) at least one substance as an additional additive, which is capable of undergoing a neutralization reaction with the acid or base groups of the at least one first gel, and combinations of 1) and 2).

28. The pneumatic tire of claim 27, wherein the acid and/or base groups of the at least one first gel are produced by reaction with an unsaturated material.

29. The pneumatic tire of claim 27, wherein the surface of the at least one first gel comprises carboxyl groups.

30. The pneumatic tire of claim 27, wherein the surface of the at least one first gel comprises hydroxyl groups.

31. The pneumatic tire of claim 27, wherein the surface of the at least one first gel comprises amino groups.

32. The pneumatic tire of claim 27, wherein the at least one second gel comprises the substance of 2) which comprises a metal salt or a metal oxide.

33. The pneumatic tire of claim 32, wherein the substance of 2) comprises metal salt and the metal salt comprises zinc stearate.

34. The pneumatic tire claim 32, wherein the substance of 2) comprises metal oxide and the metal oxide comprises a member selected from magnesium oxide and zinc oxide and mixtures thereof.

35. The pneumatic tire of claim 27, wherein the rubber mixture contains from about 10 to about 110 phr of the at least one first gel based on 100 parts of the weight of all of the rubber components.

36. The pneumatic tire of claim 27, wherein the rubber component comprises a member selected from natural rubber, polyisoprene, styrene-butadiene copolymer, polybutadiene, and mixtures thereof.

37. The rubber mixture of claim 27, wherein the acid and/or base groups of the at least one first gel are produced by reaction with an unsaturated material, and wherein the surface of the at least one first gel comprises a member selected from carboxyl groups, hydroxyl groups, amino groups and mixtures thereof and wherein the at least one second gel comprises the substance of 2) which comprises a metal salt comprising zinc stearate or a metal oxide comprising a member selected from magnesium oxide and zinc oxide and mixtures thereof, wherein the rubber component comprises a member selected from natural rubber, polyisoprene, styrene-butadiene copolymer, polybutadiene, and mixtures thereof, and wherein the at least one first gel is present in an amount of from about 10 phr to about I 10 phr based on 100 parts by weight of the rubber component, and the at least one second gel is present in an amount of up to about 110 phr based on 100 parts by weight of the rubber component.

38. A method of formulating and blending a composition comprising forming a mixture comprising at least one rubber component and at least one first gel as a filler, which comprises a rubber, has a particle size of from about $3 \times 10^{-9}$ to about $1 \times 10^{-6}$ m, and has a swelling index in toluene of from about 1 to about 15, and wherein at least the surface of the gel has groups selected from acid and base groups and combinations thereof, with the proviso that these groups have not been produced by means of reaction with dithiophosphoric acid; and adding at least one second gel as an additional filler, which comprises a member selected from
1) a rubber, has a particle size of from about $3 \times 10^{-9}$ to about $1 \times 10^{-6}$ m, and has a swelling index in toluene of from about 1 to about 15, which is capable of undergoing a neutralization reaction with the acid or base groups of the at least one first gel; and
2) at least one substance as an additional additive, which is capable of undergoing a neutralization reaction with the acid or base groups of the at least one first gel, and combinations of 1) and 2).

39. The method of claim 38, wherein the acid and/or base groups of the at least one first gel are produced by reaction with an unsaturated material.

40. The method of claim 38, wherein the surface of the at least one first gel comprises carboxyl groups.

41. The method of claim 38, wherein the surface of the at least one first gel comprises hydroxyl groups.

42. The method of claim 38, wherein the surface of the at least one first gel comprises amino groups.

43. The method of claim 38, wherein the at least one second gel comprises the substance of 2) which comprises a metal salt or a metal oxide.

44. The method of claim 43, wherein the substance of 2) comprises metal salt and the metal salt comprises zinc stearate.

45. The method of claim 43, wherein the substance of 2) comprises metal oxide and the metal oxide comprises a member selected from magnesium oxide and zinc oxide and mixtures thereof.

46. The method of claim 38, wherein the rubber mixture contains from about 10 to about 110 phr of the at least one first gel based on 100 parts of the weight of all of the rubber components.

47. The method of claim 38, wherein the rubber component comprises a member selected from natural rubber, polyisoprene, styrene-butadiene copolymer, polybutadiene, and mixtures thereof.

48. The method of claim 38, wherein the acid and/or base groups of at least one gel are produced by reaction with an unsaturated material, and wherein the surface of the at least one first gel comprises a member selected from carboxyl groups, hydroxyl groups, amino groups and mixtures thereof and wherein the at least one second gel comprises the substance of 2) which comprises a metal salt comprising zinc stearate or a metal oxide comprising a member selected from magnesium oxide and zinc oxide and mixtures thereof, wherein the rubber component comprises a member selected from natural rubber, polyisoprene, styrene-butadiene copolymer, polybutadiene, and mixtures thereof, and wherein the at least one first gel is present in an amount of from about 10 phr to about 110 phr based on 100 parts by weight of the rubber component, and the at least one second gel is present in an amount of up to about 110 phr based on 100 parts by weight of the rubber component.

* * * * *